(12) United States Patent
Tu (10) Patent No.: US 9,393,583 B2
(45) Date of Patent: Jul. 19, 2016

(54) POWDER DISPENSER

(75) Inventor: Xufeng Tu, Yuyao (CN)

(73) Assignee: Zhejiang JM Industry Co., Ltd., Yuyao (CN)

( * ) Notice: Subject to any disclaimer, the term of this patent is extended or adjusted under 35 U.S.C. 154(b) by 54 days.

(21) Appl. No.: 14/352,367

(22) PCT Filed: Aug. 30, 2012

(86) PCT No.: PCT/IB2012/002080
§ 371 (c)(1),
(2), (4) Date: Apr. 17, 2014

(87) PCT Pub. No.: WO2014/033495
PCT Pub. Date: Mar. 6, 2014

(65) Prior Publication Data
US 2014/0239021 A1    Aug. 28, 2014

(51) Int. Cl.
*B67D 7/76* (2010.01)
*B05B 11/00* (2006.01)
*B05B 1/26* (2006.01)
*B65D 83/06* (2006.01)
(Continued)

(52) U.S. Cl.
CPC .............. *B05B 11/3066* (2013.01); *B05B 1/267* (2013.01); *B05B 7/1422* (2013.01); *B05B 11/0094* (2013.01); *B05B 11/061* (2013.01); *B05B 11/067* (2013.01); *B65D 83/06* (2013.01); *A01M 11/00* (2013.01); *B05B 11/0008* (2013.01); *B05B 11/045* (2013.01); *B05B 11/046* (2013.01); *B05B 11/305* (2013.01); *B05B 11/3042* (2013.01); *B67D 7/76* (2013.01)

(58) Field of Classification Search
CPC ....... B65D 25/40; B65D 83/06; A01M 11/00; B67D 7/76; B05B 11/3066; B05B 11/3042; B05B 11/0008; B05B 11/045–11/046; B05B 11/305
USPC ................ 222/321.7–321.9, 383.3, 385, 190, 222/631–637, 401
See application file for complete search history.

(56) References Cited

U.S. PATENT DOCUMENTS

| | | | | |
|---|---|---|---|---|
| 4,007,858 A | * | 2/1977 | Shay | ..................... B05B 11/045 222/633 |
| 5,323,936 A | * | 6/1994 | Wolter | .................. A61M 13/00 128/200.22 |
| 6,319,559 B1 | | 11/2001 | Makino | |

FOREIGN PATENT DOCUMENTS

| CN | 2013395334 | 5/2009 |
|---|---|---|
| CN | 101879966 | 11/2010 |

(Continued)

OTHER PUBLICATIONS

Office Action dated Jun. 10, 2015 in corresponding Japanese Patent Application Serial No. 2014-524940.
(Continued)

*Primary Examiner* — Paul R Durand
*Assistant Examiner* — Andrew P Bainbridge
(74) *Attorney, Agent, or Firm* — Haugen Law Firm PLLP (57) ABSTRACT

A pump dispenser is arranged for dispensing solidous material under a manually-developed pressure, with the dispenser being capable of pumping and mechanically agitating the solidous material in a storage container. The resultant dispensed solidous fluid is provided with more consistent suspended solid concentrations with greater solid particle distribution homogeneity.

3 Claims, 10 Drawing Sheets

(51) Int. Cl.
B05B 7/14 (2006.01)
B05B 11/06 (2006.01)
*A01M 11/00* (2006.01)
*B05B 11/04* (2006.01)

(56) References Cited

FOREIGN PATENT DOCUMENTS

| CN | 202642483 | 1/2013 |
|---|---|---|
| CN | 202697535 | 1/2013 |
| JP | H08119353 | 5/1996 |
| JP | 2000189858 | 7/2000 |
| JP | 2005075621 | 3/2005 |

OTHER PUBLICATIONS

Written Opinion for priority application, serial No. PCT/IB2012/002080, dated Jun. 6, 2013.

* cited by examiner

_POWDER DISPENSER_

FIELD OF THE INVENTION

The present invention relates to dispensers generally, and more particularly to a dispenser with an arrangement for efficiently dispensing a solid particulate material, such as a powder, from within a container.

BACKGROUND OF THE INVENTION

While liquid manual pump and pressurized gas discharge dispensers have been widely implemented in a variety of applications, dispensers for solid materials are less common. In addition to the obvious challenge of increased viscosities, surface friction, and specific weights of solidous materials in comparison to liquid materials, the design of solid material dispensing systems must also contemplate flowability and distribution of the stored material in preparation for dispensation, as well as effects on the flowability of the material in the presence or absence of environmental conditions, such as the effect of moisture accumulation in the solid material container over time. As a consequence of these and other challenges, efforts to develop solid material dispensers have been limited.

A particular shortcoming in the availability of conventional solid material dispensers is an apparatus that is relatively inexpensive to manufacture, so as to be useful in connection with the storage, sale, and dispensation of relatively inexpensive consumer products. Currently available solid material dispensers are either prohibitively expensive to use in connection with low-cost consumer products, and particularly as a disposable consumer product dispenser, and/or are ineffective in consistently dispensing a desired quantity or quality of the solid material.

One conventional approach in solid material dispensation relies upon pressurized gas to disperse the solidous particulate material into a pseudo-suspension for uptake into outlet conduits. The pressurized gas may be air that is pressurized through a manual pumping action by the user, or may be air or another gas releasably stored under pressure in a separate container. Pumping action by the user, or the selective release of pressurized gas from the separate container, or both, act to drive the solidous material into one or more outlet conduits, and possibly as partially suspended in the pressurized gas. Such a conventional approach, however, is inconsistent in delivering a known quantity of the solid material to the outlet conduit, and is variable based upon the specific weight of the product, the amount of the product remaining within the container, the flowability of the product, and changing characteristics of the product in the container over time. Moreover, the conventional systems which rely upon pressurized air to disperse and distribute the solid material product have proven to be inadequate in dispersing and consistently dispensing a known quantity and quality of the product.

It is therefore an object of the invention to provide a dispenser mechanism for dispensing solvent particulate material, such as a powder, in a known quantity per pump cycle.

It is another object of the present invention to provide a solid particulate material dispenser that effectively maintains a homogeneity of the discharge contents for each pump cycle.

It is a further object of the present invention to provide a manual pumping mechanism for mechanically mixing the solidous material product in the container.

It is a still further object of the present invention to provide a dispenser mechanism that is effective in limiting environmental exposure to the solidous material product in the container.

SUMMARY OF THE INVENTION

By means of the present invention, solidous material may be dispensed with consistent qualities and concentrations. A device for dispensing such solidous material may be economically manufactured, so as to be useful in disposable and other relatively low-cost consumer product applications.

In one embodiment, a pump dispenser of the present invention for dispensing material under a manually developed pressure includes a container defining a cavity for storing the material, and a pump body positionable in the cavity having a pump chamber, a pickup chamber, and a dispensation chamber. The pump body has a central axis defining mutually perpendicular axial and radial directions, and includes an intake opening communicating the cavity with the pickup chamber. The pump dispenser includes a piston that is positioned at the pump chamber, and is slidably engaged to the pump body. The piston is axially movable in the pump chamber, and includes an air inlet aperture. An air intake valve regulates airflow through the air inlet aperture of the piston. The pump dispenser further includes a manipulator removably secured to the pump body at a manipulator portion, with the manipulator including an arm with a distal end configured to cooperate with the intake opening for passage of the material into the pickup chamber through the intake opening. An actuator rod is axially movable to actuate the manipulator, and to thereby operate the manipulator arm.

In another embodiment, a pump dispenser of the present invention includes a container defining a cavity for storing a dispensable material, and a pump body positionable in the cavity and having a pump chamber fluidly communicatable with a pickup chamber that is fluidly communicatable with a dispensation chamber. At least a portion of the dispensation chamber is defined by a lumen of a flexible resilient member. The pump body further includes an intake opening communicating the cavity with the pickup chamber, and a central axis defining mutually perpendicular axial and radial directions. The flexible resilient member sealingly separates the dispensation chamber from the pump chamber, so that the pump chamber is fluidly communicatable with the dispensation chamber only thorough the pickup chamber. The pump dispenser further includes a piston positioned at the pump chamber, and slidably engaged with the pump body. The piston is axially movable in the pump chamber in a first axial direction to force airflow into the pickup chamber to an extent sufficient to carry the dispensable material through the dispensation chamber.

DETAILED DESCRIPTION OF THE PREFERRED EMBODIMENTS

The objects and advantages enumerated above together with objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

In the following description of the invention, the terms "top" and "bottom", "upper" and "lower", or similar related terms are used to describe the component parts of the dispenser and their relative positions. Such terms are used only with respect to the drawings, and should not be considered limiting as to the absolute orientation of the component parts in operation.

Figure 1A:
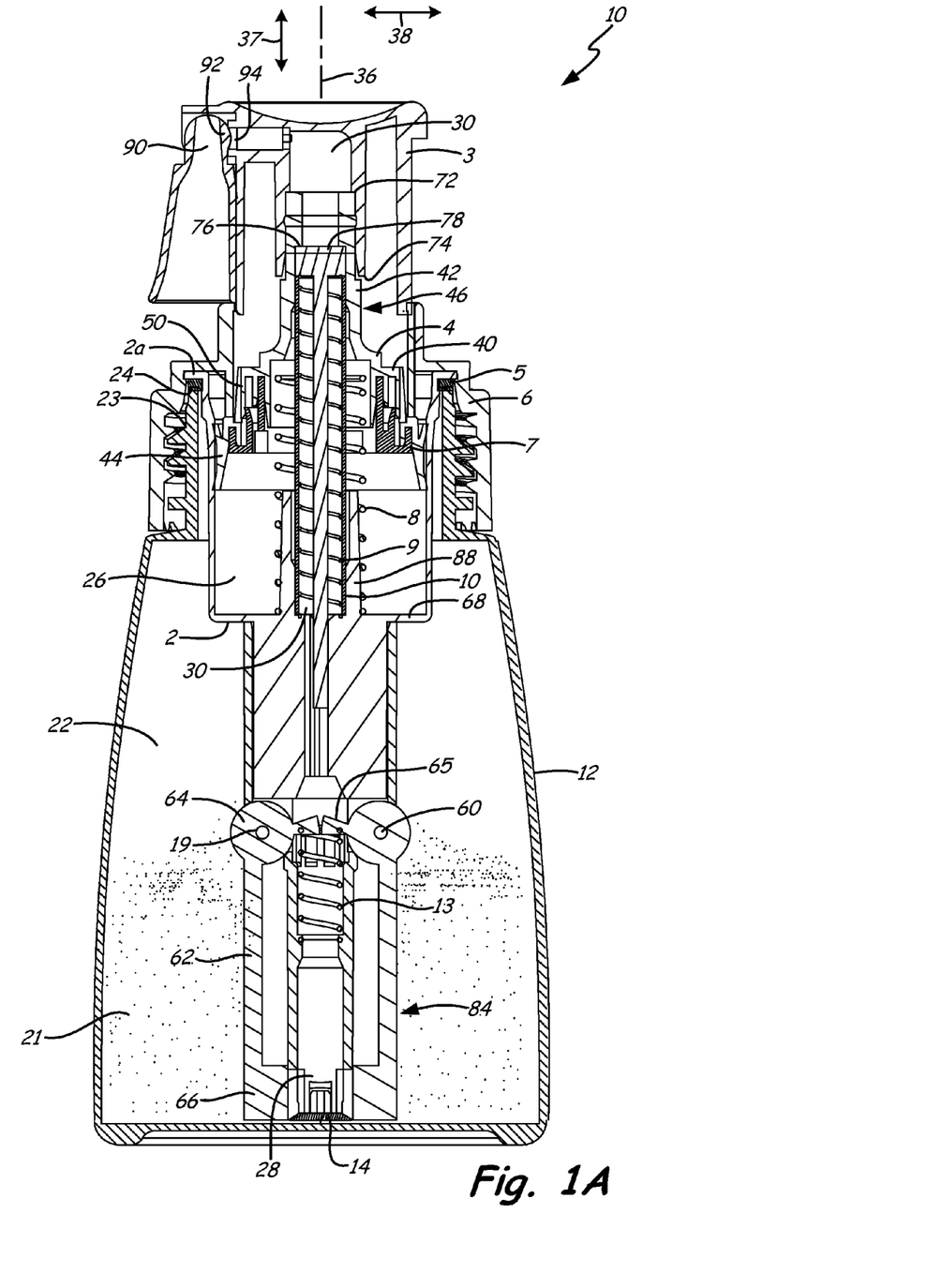
FIG. 1A is a cross-sectional view of a dispenser of the present invention in a top position.
Figure 1B:
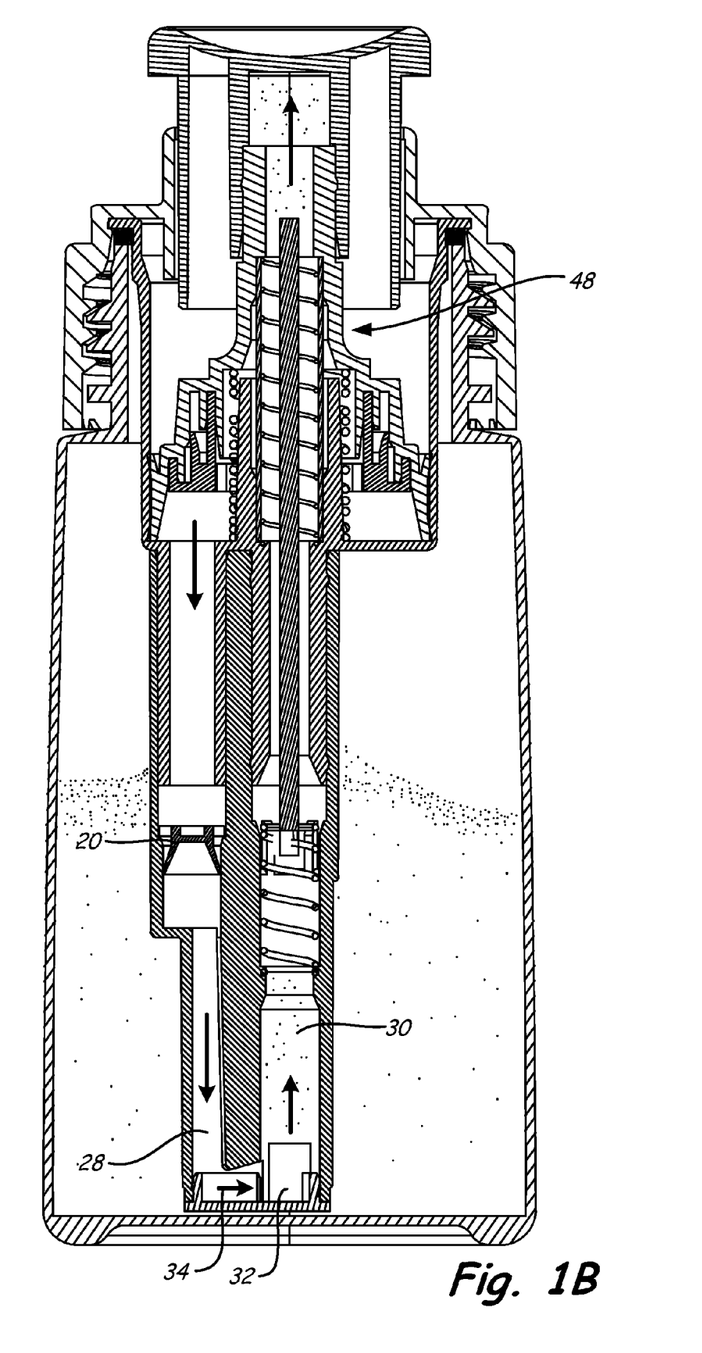
FIG. 1B is a cross-sectional view of the dispenser illustrated in FIG. 1A in a bottom position.
Figure 2A:
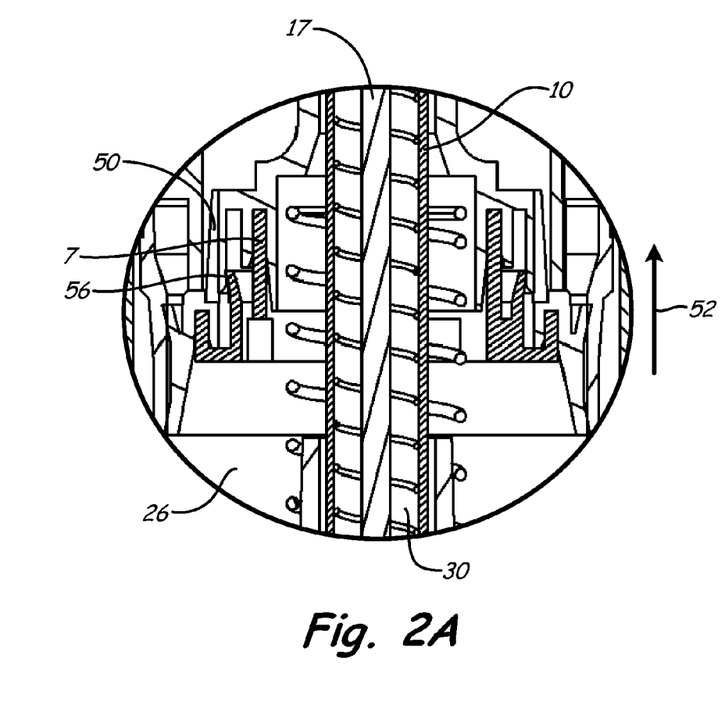
FIG. 2A is an enlarged cross-sectional view of a portion of the dispenser illustrated in FIGS. 1A and 1B during an upstroke portion of a pump cycle.
Figure 2B:
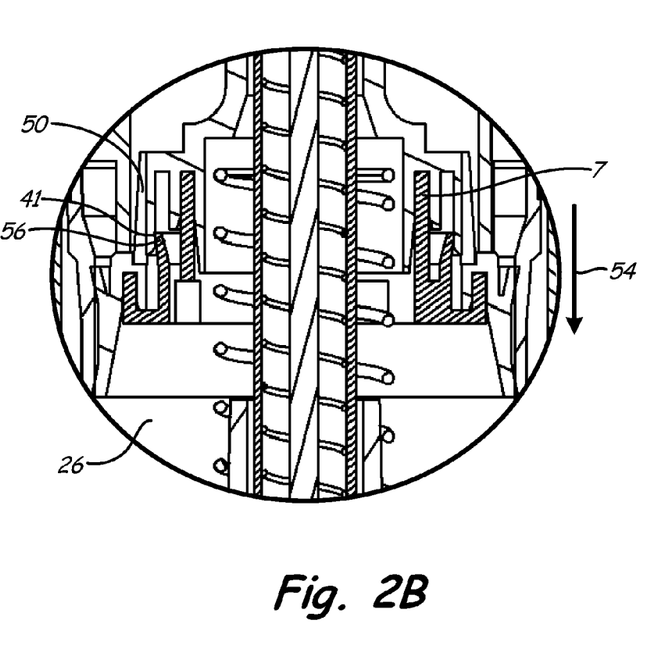
FIG. 2B is an enlarged cross-sectional view of a portion of the dispenser illustrated in FIGS. 1A and 1B during a downstroke portion of a pump cycle.

With reference now to the drawing figures, and first to FIGS. 1A and 1B, a pump dispenser 1 may be particularly suited for dispensing solidous material under a manually-developed pressure. The solidous material may be solid particulate matter that is dispersible into a suspension, pseudo-suspension, or mixture in air, so as to be dispensable under the force of pressurized air as a suspension, dispersion, or mixture of solid matter in a moving air stream. In some embodiments, the solidous material 21 may be talcum powder including hydrated magnesium silicate as foliated to fibrous masses with a specific gravity of 2.5-2.8 g/cm$^3$. Other particles, crystals, fibers, minerals, agglomerates, compounds, and the like, however, are contemplated as being dispensable by pump dispenser 1 of the present invention.

Pump dispenser 1 includes a container 12 defining a cavity 22 in which solidous material 21 may be stored and prepared for dispensation. Container 12 may be in the form of, for example, a plastic bottle having a threaded neck portion 23 that cooperatively engages with a connector 6 for securement of the pumping mechanism to container 12, as will be described in greater detail hereinbelow. Container 12 may accordingly assume a variety of configurations and materials suitable in the containment of solidous material 21.

Pump body 2 is positionable in container 12, and securable to neck portion 23 by being press fit between connector 6 and an upper edge 24 of neck portion 23. In the illustrated embodiment, a resilient gasket 5 assists in sealingly securing pump body flange 2*a* to upper edge 24 of neck portion 23. The threadable engagement of connector 6 to neck portion 23 desirably secures pump body 2 to container 12 in a sealed manner.

Pump body 2 includes a pump chamber 26, a pickup chamber 28, and a dispensation chamber 30. The operation of pump dispenser 1 provides for manually pressurized air flow to pass from pump chamber 26 to pickup chamber 28, and subsequently to dispensation chamber 30, and ultimately out through nozzle member 15 of cap 3. The operation of pump dispenser 1 will be described in greater detail hereinbelow, and it is contemplated that one or more valves and the like may separate one or more of pump chamber 26, pickup chamber 28, and dispensation chamber 30. However, in the illustrated embodiment, pressurized air or other gas may be communicated by the operation of pump dispenser 1 from pump chamber 26 through pickup chamber 28 and dispensation chamber 30. Accordingly, the combination of pump chamber 26, pickup chamber 28, and dispensation chamber 30 may be alternatively considered as a single fluidly connected chamber. For the purposes of this description, however, portions of the pressurized air travel through pump dispenser 1 will be described as the above-indicated chamber segments. It is to be understood that no specific structure may define a transition from or between any of pump chamber 26, pickup chamber 28, and dispensation chamber 30, with such chambers being delineated herein for descriptive purposes only.

In the illustrated embodiment, pump chamber 26 communicates with pickup chamber 28 through a separation valve 20, which may be a one-way valve permitting air flow into pickup chamber 28 from pump chamber 26 upon a sufficient pressure drop from pump chamber 26 to pickup chamber 28. An example separation valve 20 is a check valve with a predetermined opening force that opens only when a sufficient pressure differential is created between pump chamber 26 and pickup chamber 28. In most embodiments, the force necessary to open separation valve 20 is relatively small, in that the primary utility of separation valve 20 may be to prevent backflow of air and/or solidous material 21 from pickup chamber 28 to pump chamber 26. Another utility of separation valve 20 may be to provide a "burst" airflow from pump chamber 26 to pickup chamber 28, as a sudden pressurized airflow released from pump chamber 26 upon exceeding the opening force of separation valve 20. Such a bust airflow into pickup chamber 28 may assist in dispersing solidous material 21 into the moving airstream in pickup chamber 28 for passage of a solidous material/airflow mixture into dispensation chamber 30.

An intake opening 32 communicates cavity 22 with pickup chamber 28, and represents an opening through which solidous material 21 may be imported into the air flow path for dispensation out from pump dispenser 1. Intake opening 32 may be positioned at or near base 14 of pump body 2, wherein the force of gravity will typically congregate solidous material 21 near the bottom of cavity 22, in close approximation to base 14. Consequently, solidous material 21 may be available for introduction through intake opening 32 until solidous material 21 is nearly or completely exhausted from cavity 22. To be effective as an entry point for solidous material 21, intake opening 32 is preferably appropriately sized and configured to permit an adequate loading rate of solidous material 21 therethrough to accommodate dispersion of solidous material into the pressurized airstream at pickup chamber 28 at a desired volumetric concentration. In some embodiments, intake opening 32 may have an opening area of between about 10-100 mm$^2$, and more preferably between about 25-50 mm$^2$.

A connector portion 34 may constitute a transition from pickup chamber 28 to dispensation chamber 30. In some embodiments, connector portion 34 may be located at or near base 14, and directs pressurized airflow adjacently past intake opening 32 into dispensation chamber 30.

Pump body 2 has a central axis 36 that defines mutually perpendicular axial and radial directions 37, 38. Pump body 2 may typically be arranged to facilitate pumping actuation generally along axial direction 37, though alternative arrangements are contemplated by the present invention.

Pump dispenser 1 further includes a piston 4 that is slidably engaged to pump body 2 so as to selectively generate pressurized air in pump chamber 26 upon a downwardly axial movement of piston 4 with respect to pump body 2. Piston 4 includes a piston head portion 40, a piston rod portion 42, and a piston seal portion 44 extending from piston head portion 40. Piston seal portion 44 is slidably engaged with, and preferably makes an air-tight seal with side wall 18 of pump body 2 defining a portion of pump chamber 26. Axial downward motion of piston 4 into pump chamber 26, as illustrated in FIG. 1B, compresses air within pump chamber 26, correspondingly increasing the air pressure within pump chamber 26 to a level exceeding the opening force of separation valve 20, as described above. Once open, separation valve 20 permits pressurized air to flow therethrough and into pickup chamber 28 for dispersion of solidous material 21 into a mixed airflow stream delivered to dispensation chamber 30. The directional arrows depicted in FIG. 1B illustrate the pressurized airflow through pump chamber 26, pickup chamber 28, and dispensation chamber 30. In operation, piston seal portion 44 reciprocally moves up and down in slidable engagement with side wall 18 of pump body 2, as depicted in the relationship between FIGS. 1A and 1B. Piston 4 is in a top position 46 in FIG. 1A, and a bottom position 48 in FIG. 1B. As will be described in greater detail hereinbelow, movement of piston 4 between top position 46 and bottom position 48 drives the operation of pump dispenser 1 in collecting and dispensing a solid product mixture under pressure.

Piston head portion 40 includes an air inlet aperture 50 that is regulated by an air intake valve 7 to selectively permit passage of air from an exterior environment into pump chamber 26. An enlarged view of piston head portion 40 and air intake valve 7 is illustrated in FIGS. 2A and 2B, with FIG. 2A representing an "upstroke" of piston 4 resulting in air intake valve 7 permitting air flow into pump chamber 26, and FIG. 2B illustrating the "downstroke" of piston 4 in which air intake valve 7 prevents air from escaping from pump chamber 26 through air inlet aperture 50. The upward axial movement of piston 4 during the upstroke portion of a pumping cycle is denoted by directional arrow 52, and the axially downward motion of piston 4 in the downstroke portion of the pumping cycle being illustrated in FIG. 2B and represented by directional arrow 54. During the upstroke portion of the pumping cycle illustrated in FIG. 2A, upward axial movement of piston 4 driven by a spring bias force creates a reduced pressure environment in pump chamber 26 as the volume of pump chamber 26 expands. The reduced pressure environment within pump chamber 26 creates pressure differential with respect to the ambient, thereby developing a force that pushes valve tip 56 away from a boundary wall 41 of piston head portion 40. The displacement of valve tip 56 from boundary wall 41 is also driven by the air pressure differential between the exterior environment and the reduced pressure environment within pump chamber 26. The relative positive pressure applied against valve tip 56 displaces it away from contact with boundary wall 41. Such displacement permits the entry of air through air inlet aperture 50 and around valve tip 56 into pump chamber 56, as illustrated in FIG. 2A.

Downward axial movement of piston 4 during the downstroke of the pump cycle illustrated in FIG. 2B creates an increased pressure environment within pump chamber 26 as a result of the reduced volume within pump chamber 26. The increased pressure within pump chamber 26 forces valve tip 56 against boundary wall 41 in an air sealing manner to prevent escape of air out through air inlet aperture 50. Air intake valve 7 therefore acts as a one-way valve to permit air entry through air intake aperture 50 during the upstroke of piston 4, but prevents the escape of air from pump chamber 26 during the compression downstroke portion of the pumping cycle. Various valving arrangements for manual pumping systems are well known in the art, and a variety of configurations therefore are contemplated as being useful in the present invention.

In one aspect of the present invention, one or more manipulators 19 may be pivotally secured to pump body 2 at a manipulator pivot 60. While the illustrated embodiment depicts two manipulators 19 pivotally secured to pump body 2 about respective manipulator pivots 60, it is contemplated that one or more such manipulators 19 may be incorporated with pump dispenser 1, and that various mechanisms may be employed for actuating a mechanical motion to manipulators 19. In the illustrated embodiment, manipulators 19 include a manipulator arm 62 extending from a manipulator head 64 and a distal end 66 that is configured to cooperate with intake opening 32 of pump body 2 for the passage of solidous material 21 into pickup chamber 28 through intake opening 32. In some embodiments, manipulator 19 may be arranged to open and close access to intake opening 32 in sequence with the pumping cycle applied to piston 4, and to also perform a mechanical motion that aids in the distribution of solidous material 21 into a relatively homogenous mass, and with a characteristic that facilitates collection and uptake through intake opening 32. For example, solidous material 21 may have the tendency to settle under the force of gravity into a relatively non-flowable mass, and may further naturally settle under the force of gravity into a non-homogeneous particle size/specific weight distribution. By disturbing the mass of solidous material 21 prior to loading/intake of solidous material 21 to pickup chamber 28, it is more likely that a more homogeneous sample of solidous material 21 may be collected for dispensation from pump dispenser 1. Manipulators 19 may therefore act as disturbing/agitating members for mixing and distributing the mass of solidous material in container 12. It is also contemplated, however, that manipulators 19 may assist in loading pickup chamber 28 with a volume of solidous material 21 by, in effect, "pushing" solidous material 21 into pickup chamber 28 through intake opening 32. In some cases, the mechanical action of manipulators 19 may act to provide a consistent loading volume and/or mass of solidous material 21 into pickup chamber 29 through intake opening 32. One aspect of the present invention is the enhanced ability of pump dispenser 1 to collect and dispense a known quantity of solidous material 21 in each pumping cycle. Moreover, by repeatedly agitating solidous material 21, manipulators 19 may aid in providing a consistent sample quality or homogeneity to pickup chamber 28 in each pumping cycle. In this manner, pump dispenser 1 advantageously is capable of dispensing a more consistent quantity and homogeneity of solidous material 21 in each pumping cycle, as compared to conventional dispensing devices.

To actuate manipulators 19, an actuator rod 17 may be axially movable to actuate manipulators 19 about respective manipulator pivots 60, to thereby pivotally operate manipulator arms 62 to agitate, disperse, and collect solidous material 21.

Piston 4 is axially movable with respect to pump body 2 against a first bias member 8 which, in the illustrated embodiment, is a coil spring. First bias member is placed into pump dispenser 1 under axial compression to establish a bias force urging piston 4 axially upwardly along direction 37 toward top position 46. First bias member 8 may be placed in axial compression between the pump chamber base platform 68 and a piston head platform 70. As illustrated in FIG. 1B, for example, first bias member 8 is in axially expansive contact with both base platform 68 and piston head platform 70 urging piston 4 axially upwardly with respect to pump body 2, with pump chamber base platform 68 bearing against, connected to, or integrally formed as a part of pump body 2. Actuation of piston 4 in the downstroke portion of the pump cycle must therefore overcome the bias force generated by first bias member 8.

The generation of a downward force applied against piston 4 may be originated by the user at cap 3, wherein downward pressure upon cap 3 is transmitted to piston rod portion 42 at cap shoulder 72 and/or cap end edge 74. Contact made between cap shoulder 72 and/or cap end edge 74 with piston rod portion 42 of piston 4 transmits the downward force applied to cap 3 by the user to piston 4. Such downward force overcomes the bias force of first bias member 8 to move piston 4 axially downwardly in the downstroke portion of the pump cycle.

Actuator rod 17 is axially responsive to the moving force applied to piston 4 through cap 3, as described above. The downward moving force may be applied to actuator rod 17 by piston rod portion 42 of piston rod 4 at an interface between piston rod shoulder 76 and actuator rod head 78. In the illustrated embodiment, actuator rod 17 is thereby axially movable in dispensation chamber 30 as a result of the applied downward moving force from cap 3 and piston 4.

Actuator rod 17 is therefore movable axially downwardly through dispensation chamber 30 to contact and actuate manipulator head 64 about its respective pivot 60. The actuation of manipulators 19 is illustrated in isolation in FIG. 3. As actuator rod 17 is axially moved downward in the downstroke as described above, end portion 80 of actuator rod 17 contacts manipulator tabs 65 extending from manipulator head 64. Continued downward movement of actuator rod 17 actuates manipulators 19 by pushing manipulator tabs 65 downwardly to cause the respective manipulator heads 64 to pivot about their respective manipulator pivots 60. Such pivoting motion, as described above, causes manipulator arms 62 to move outwardly from pump body 2 along an arcuate path about respective pivot axes 61 extending through manipulator pivots 60. In the illustrated embodiment, pivot axis 61 is substantially perpendicular to central axis 36. However, it is contemplated that other relationships may be employed to effectuate a desired movement of manipulators 19 in agitating and manipulating solidous material, 21 in cavity 22.

Actuation of manipulators 19 about their respective pivot axis 61 acts against a restorative force generated by a second bias member 13 which, in the illustrated embodiment, is a coil spring placed under axial compression between a pump body platform 82 and manipulator tabs 65. Downward force applied from actuator rod 17 to manipulator tabs 65 therefore acts against the restorative urging force of second bias member 13. When downward pressure against manipulator tabs 65 is released, a restorative urging force of second bias member 13 pushes manipulator tabs 65 upwardly in an opposite pivotal direction to bring manipulator arms back toward a closed position 84, as illustrated in FIG. 1A. Such a closed position orients distal ends 66 of manipulator arm 62 over intake openings 32. Thus, distal ends 66 may at least partially cover intake opening 32 when manipulator arm 19 is in closed position 82.

Figure 3:
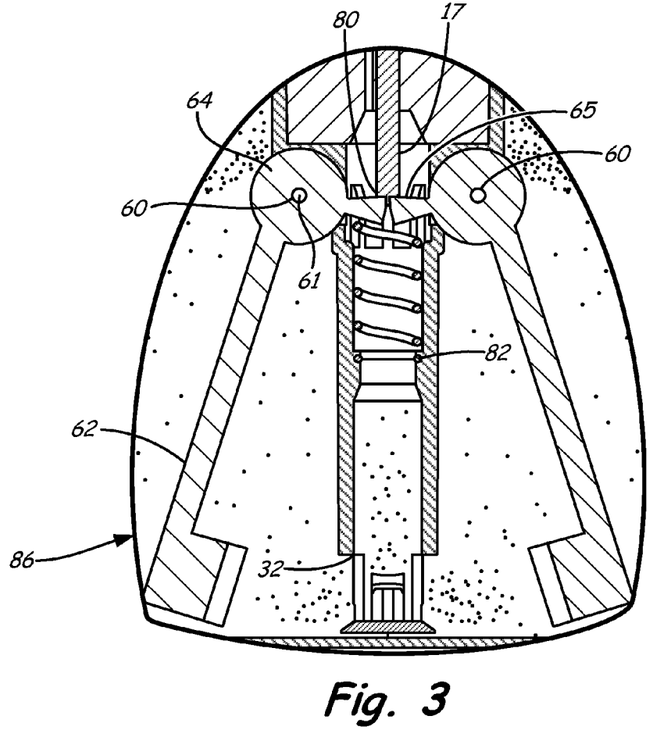
FIG. 3 is an enlarged cross-sectional view of a portion of the dispenser illustrated in FIGS. 1A and 1B.

As described above, manipulator arms 62 are arranged to open and close in response to the pumping action of pump dispenser 1. An open position 86 of manipulators 19 is illustrated in FIG. 3. As described above, one function of manipulators 19 is to agitate and distribute solidous material 21 to create a more homogenous mass of solidous material 21 for entry into pickup chamber 28 through intake opening 32. It is also contemplated that the cooperation of manipulators 19 with intake opening 32 may perform one or more additional utilities for facilitating the output of consistent air/particulate mixtures. In one mode of operation, downstroke travel of piston 4 continues for a distance before actuator rod 17 comes into contact with manipulators 19. In such mode, therefore, pressurized air in pump chamber 26 is developed before manipulators 19 are actuated to move actuator arms 62 from closed position 84 to open position 86. In some embodiments, such increased air pressure in pump chamber 26 is sufficient to open separation valve 20, such that pressurized air may pass through pickup chamber 28 and into dispensation chamber 30 prior to actuator rod 17 causing the opening of manipulator arms 62. In such embodiment, solidous material 21 loaded into pickup chamber 28 through intake opening 32 in the previous pump cycle is picked up by the airstream moving through pickup chamber 28, and carried into dispensation chamber 30 as an air, solid mixture. After the air/solid mixture has been dispensed out from dispensation chamber 30, continued downward movement of actuation rod 17 presses upon manipulator tabs 65 to pivotally rotate manipulator arms 62, and to correspondingly remove distal ends 66 from a covering relationship with respect to intake opening 32. The opening motion of manipulator arms 62 distributes and, to an extent, homogenizes solidous material 21 with the subsequent closing movement of manipulator arms 62 upon the release of downward pressure against manipulator tabs 65 by actuator rod 17 causing distal ends 66 to push solidous material 21 into uptake chamber 28 through intake opening 32 as a loading operation for pickup by the airstream in the subsequent pump cycle. In this manner, a substantially known quantity of solidous material 21 may be loaded to pickup chamber 28 in each pumping cycle through the action of the collectors formed by distal ends 66 of manipulator arms 60. It may be a desired characteristic of the present invention to establish a known quantity of solidous material 21 to be dispensed in each pump cycle, and the "collection" action of distal ends 66 of manipulator arms 62 to capture and collect solidous material 21 in the opening and closing action cycle accomplishes the loading of a relatively consistent amount of solidous material 21 into pickup chamber 28.

In another mode of operation, actuator rod 17 contacts and actuates manipulator tabs 65 to open manipulator arms 62 simultaneously with the passage of the pressurized airflow from pump chamber 26 through pickup chamber 28. In such operational mode, pressurized air developed in pump chamber 26 is able to open and pass through separation valve 20 substantially simultaneously with the opening of manipulator arms 62 from closed position 84 to open position 86. Solidous material 21 is drawn into intake opening 32 by a suction force generated as a result of the pressurized airstream traveling through connector portion 34 and into dispensation chamber 30. This mode of operation is illustrated in FIG. 3 by the directional arrows of solidous material 21 entering pickup chamber 28 through intake opening 32.

The mode of operation of pump dispenser 1 may be driven as a result of the relationship of the length of actuator rod 17 and its position of contact in the actuation of manipulator 19 in relation to the travel distance of piston 4 between top position 46 and bottom position 28. It is to be understood that various modifications and customizations may be made for the timing and extent of opening of intake opening 32 by the actuation of manipulator arm 62 with respect to the travel of piston 4 between top position 46 and bottom position 48 in the pumping cycle.

Figure 4:
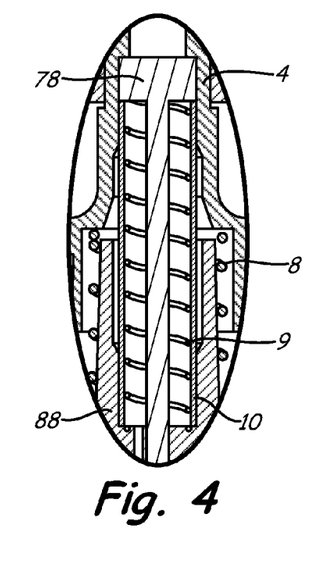
FIG. 4 is an enlarged cross-sectional view of a portion of the dispenser illustrated in FIGS. 1A and 1B.

Another aspect of the present invention is illustrated in FIGS. 1A, 1B, and 4, wherein at least a portion of dispensation chamber 30 is defined by a lumen of a flexible resilient member 10 that sealingly separates dispensation chamber 30 from pump chamber 26 in a manner so that pump chamber 26 is fluidly communicatable with dispensation chamber 30 only through pickup chamber 28. Resilient tube 10 is of a characteristic which permits a sealing, air-tight connection to both piston rod portion 42 of piston 4 and support column 88 of pump body 2. Thus, a sealed passageway portion of dispensation chamber 30 may be defined by resilient tube 10 between support column 88 of pump body 2 and piston rod portion 42 of piston 4. For the purposes hereof, the term "sealing" is intended to mean a substantially air-tight connection up to air pressures exerted upon components of pump dispenser 1 in its normal operation. The substantially air-tight connection forming the "sealing engagement" between resilient tube 10 and piston 4 and between resilient tube 10 and support column 88 is therefore adequate to contain and convey the mixed air/particulate solid air stream pressurized by the pumping action of piston 4 in pump chamber 26. The substantially air-tight sealing connection substantially prevents air leakage into or out from dispensation chamber 30 under the normal operating conditions of pump dispenser 1.

To create the sealing connection described above, tube 10 is preferably sufficiently resilient to self-seal against the respective surfaces of piston rod portion 42 and support column 88 under a moderate radially expansive force supplied by a scaffold 9 which, in the illustrated embodiment, is a coil spring placed under radial compression in the lumen of resilient tube 10. Scaffold 9 is preferably arranged to provide a restorative radially outwardly-directed force that is sufficient to press resilient tube 10 into a sealing engagement with piston rod portion 42 of piston 4 and support column 88 of pump body 2. Scaffold 9 may further be arranged to assist in maintaining open the lumen of resilient tube 10 during the pumping cycle in which actuator rod head 78 axially compresses scaffold 9, preferably against a restorative bias force of scaffold 9, during the downstroke portion of the pump cycle. Due to the downward movement of actuator rod head 78 during the downstroke of the pump cycle, resilient tube 10 is also preferably sufficiently flexible to permit a folding or wrinkling of resilient tube 10 during the downstroke, only to be restored to its original configuration upon completion of the upstroke toward top position 46. In such a manner, resilient tube 10 forms a sealing and flexible portion of the structure defining dispensation chamber 30 to accommodate the movement of actuator rod 17 through dispensation chamber 30. An example material for resilient tube 10 is a silicone having an inner diameter of about 1-10 mm, and preferably between about 3-7 mm, and a wall thickness of about 0.1-4 mm, and more preferably between about 0.2-1.5 mm. Such parameters provide the desired extent of resilience and flexibility, which are an aspect of the present invention.

As described above, axial compression of scaffold 9 preferably generates a restorative axial force urging actuator rod head 78 upwardly along axial direction 37. Scaffold 9 may be a distinct component positioned in the lumen of resilient tube 10, or may instead be incorporated within or radially external to resilient tube 10. Moreover, it is contemplated that resilient tube 10 may assume configurations other than a cylindrical tube, and may have only portions of which exhibit resilient and/or flexible properties. It is to be understood that resilient tube 10 is contemplated as defining a flexible portion of the structure defining dispensation chamber 30 to accommodate the movement of actuator rod 17 with respect to dispensation chamber 30.

Figure 8:
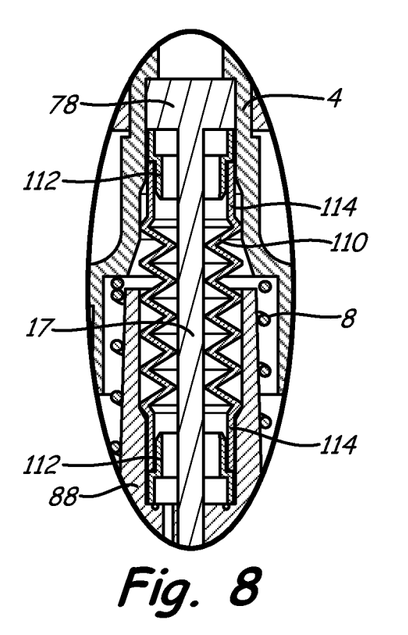
FIG. 8 is an enlarged cross-sectional view of a portion of a dispenser of the present invention.

An example alternative embodiment for the combination of resilient tube 10 and scaffold 9 is illustrated in FIG. 8, wherein flexible tube 110 is engaged to actuator rod 17 through resilient plugs 112 to define a portion of dispensation chamber 30, and to sealingly separate dispensation chamber 30 from pump chamber 26 in a similar manner as that described above. Resilient plugs 112 may preferably have an inner diameter that is substantially equal to an outer diameter of actuator rod 17, so as to frictionally and resiliently engage an outer diameter surface of actuator rod 17, with a first resilient plug 112 being positioned at actuator rod head 78 of actuator rod 17, and a second resilient plug 112 being positioned at support column 88 of pump body 2. Resilient plugs 112 may be fabricated from a rubber or other material that exhibits elastomeric-type properties of resiliently engaging actuator rod 17 and flexible tube 110.

As illustrated in FIG. 8, flexible tube 110 may have an "accordion" type configuration to facilitate axial compression and expansion in response to the pump cycle, as described above. In one example embodiment, flexible tube 110 may be fabricated from a relatively thin-walled polyethylene, such as low density polyethylene. End sections 114 of flexible tube 110 may be frictionally engaged with resilient plug members 112, and sealingly engaged between plug members 112 and a respective one of piston 4 and support column 88.

Figure 5A:
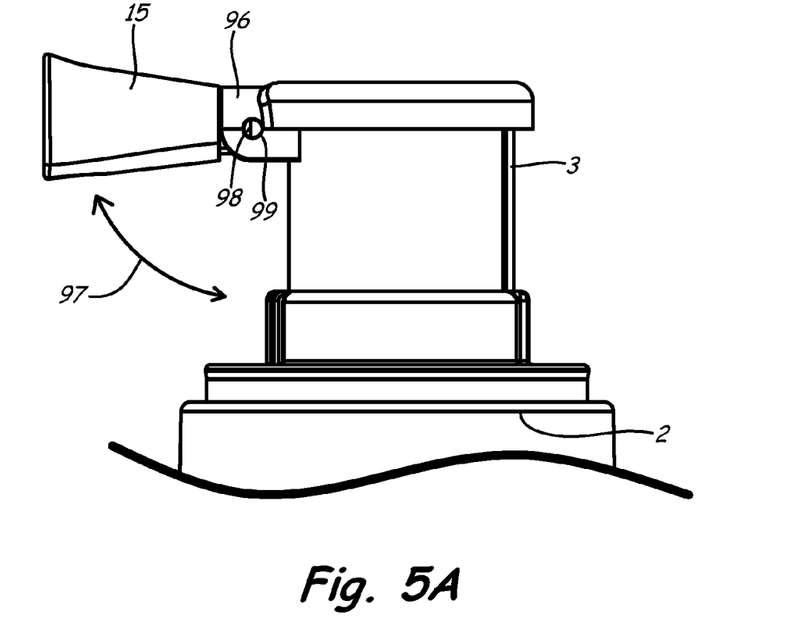
FIG. 5A is a side view of a portion of the dispenser apparatus illustrated in FIGS. 1A and 1B with a nozzle member in an open condition.
Figure 5B:
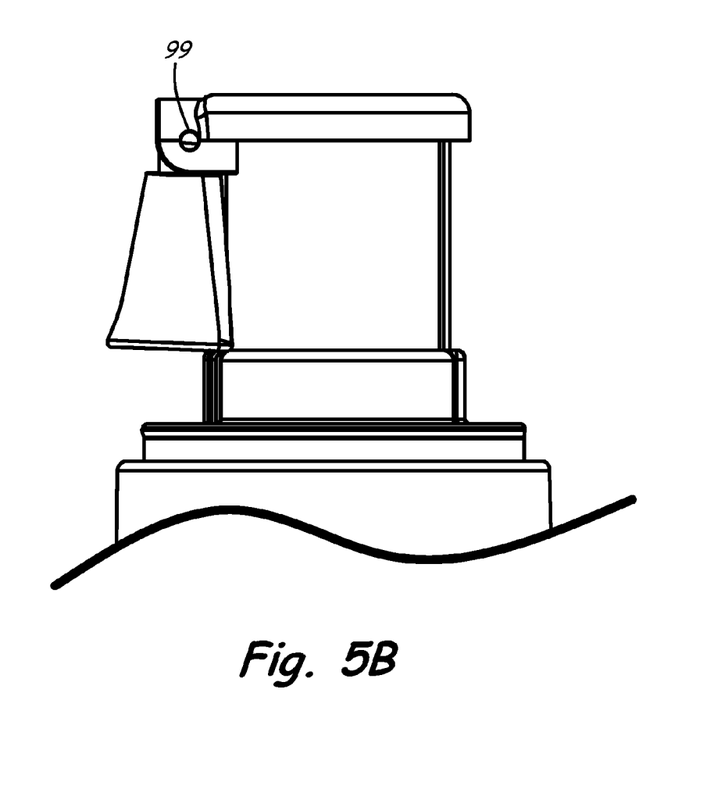
FIG. 5B is a side view of a portion of the dispenser illustrated in FIGS. 1A and 1B with the nozzle member in a closed condition.

Another aspect of the present invention includes a nozzle member 15 having a channel 90 extending therethrough for dispensing the air/solidous material mixture out from dispensation chamber 30. In the illustrated embodiment, nozzle member 15 may be selectively movable to bring channel 90 into and out from communication with dispensation chamber 30 in cap 3. In the closed condition for nozzle member 15 illustrated in FIGS. 1A, 5B, and 6A, wall 92 substantially or completely blocks an outlet 94 of dispensation chamber 30 in cap 3. When pivoted to an open condition, nozzle member 15 presents channel 90 to outlet 94 of dispensation chamber 30, as illustrated in FIGS. 5A and 6B, to permit dispensation of the air/solidous material flow stream out from pump dispenser 1. Nozzle member 15 may be pivotally secured to cap bracket 96 with a pivot nodule 98 extending through cap bracket recess 99. The pivoting motion of nozzle member 15 is depicted by directional arrow 97.

An advantage introduced the pivoting nozzle member 15 is the capability to easily close off outlet 94 of dispensation chamber 30, so as to inhibit or prevent moisture or other environmental element intrusion from the exterior environment into dispensation chamber 30, and, more importantly, to the solidous material-containing cavity 22. In some embodiments, pump dispenser 1 may be employed to operably dispense talcum powder, the physical properties of which may be significantly altered in high moisture environments. Therefore, it may be a useful function of pump dispenser 1 to limit the accessibility of moisture to solidous material 1 in container 12. The capability of nozzle member 15 to pivot into a positioning in which wall 92 closes outlet 94 of dispensation chamber 30 creates a closed environment for solidous material 21 that minimizes moisture or other environmental element intrusion to cavity 22.

Figure 6A:
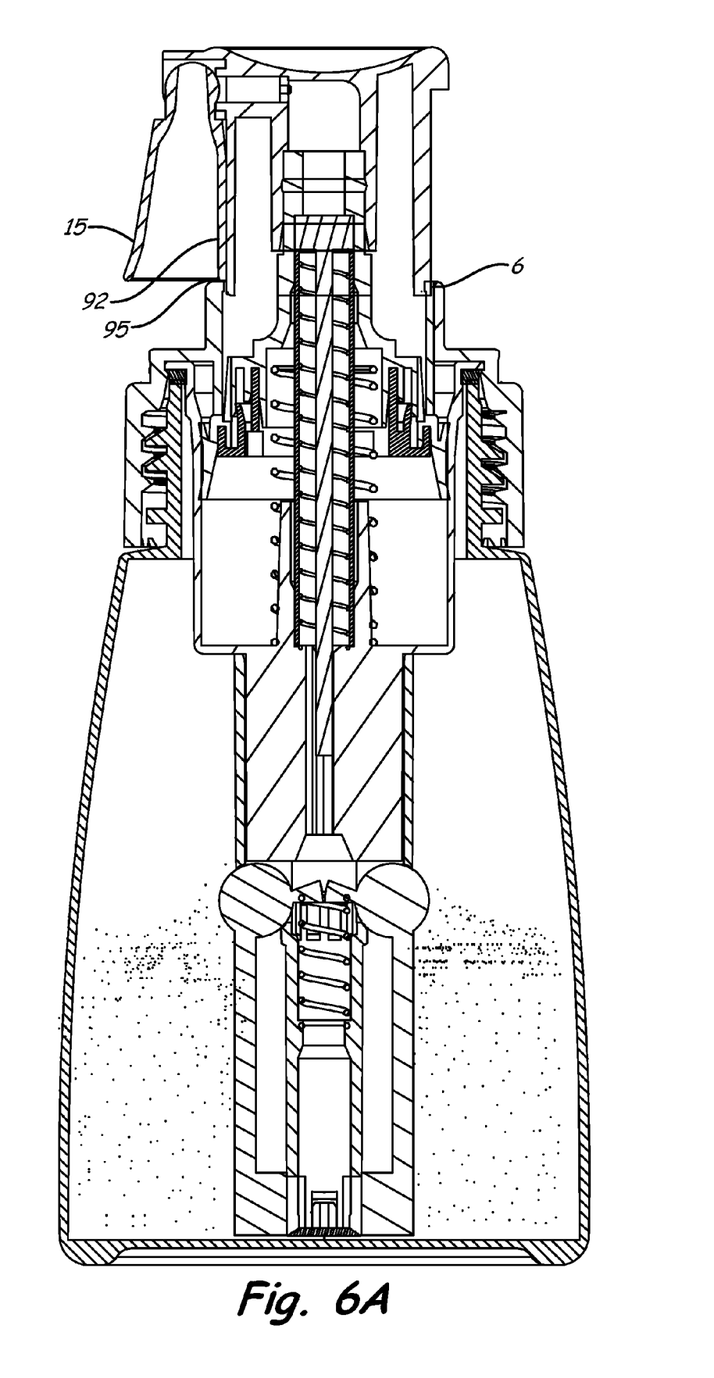
FIG. 6A is a cross-sectional view of a dispenser of the present invention in a top position.
Figure 6B:
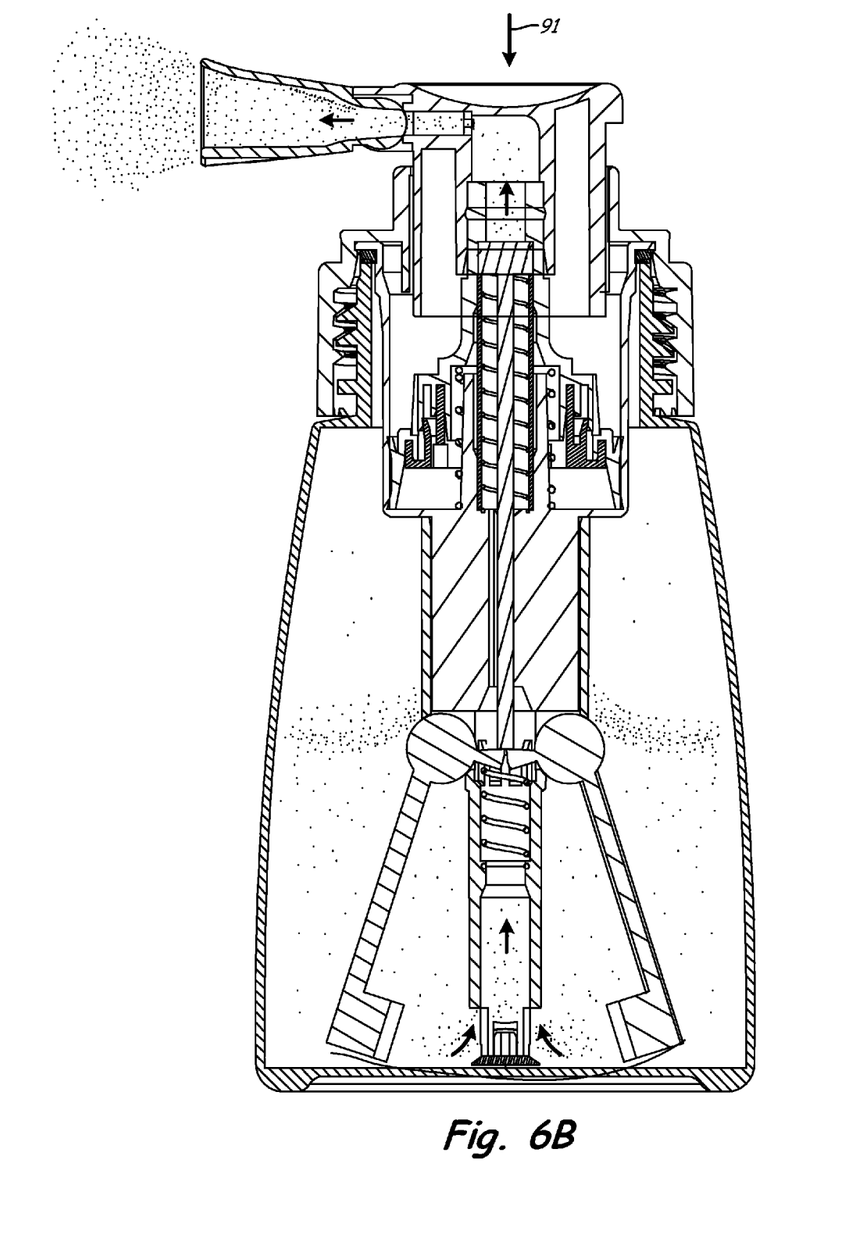
FIG. 6B is a cross-sectional view of the dispenser illustrated in FIG. 6A in a bottom position.

Another utility of pivotable nozzle member 15 is illustrated in FIGS. 6A and 6B, wherein wall 92 of nozzle member 15 may be pivoted into a closed condition to prevent actuation of pump dispenser 1. In particular, the close condition of nozzle member 15 positions wall 92 for contact with upper surface 95 of connector 6. In the event that cap 3 is attempted to be pushed downwardly, as in the downstroke of a pump cycle, contact between wall 92 and upper surface 95 of connector 6 prevents or stops downward motion of cap 3. In some embodiments, the configuration of nozzle member 15 places wall 92 substantially in contact with upper surface 95 of connector 6 when piston 4 is in top position 46. Such an arrangement establishes a "lock", in which nozzle member 15 prevents downward motion of cap 3 when nozzle member 15 is in a closed condition. In other embodiments, however, the closed condition of nozzle member 15 permits some downward motion of cap 3, but arrests such downward motion between top position 46 and bottom position 48. FIG. 6B illustrates nozzle member 15 in an open condition with channel 90 in fluid communication with outlet 94 of dispensation chamber 30 in cap 3. The positioning of nozzle member 15 in an open condition, as illustrated in FIG. 6B, permits downward movement of cap 3, as depicted by directional arrow 91, in the downstroke of the pump cycle to create a pressurized air stream to dispense the air/product mixture out from nozzle member 15.

Figure 7A:
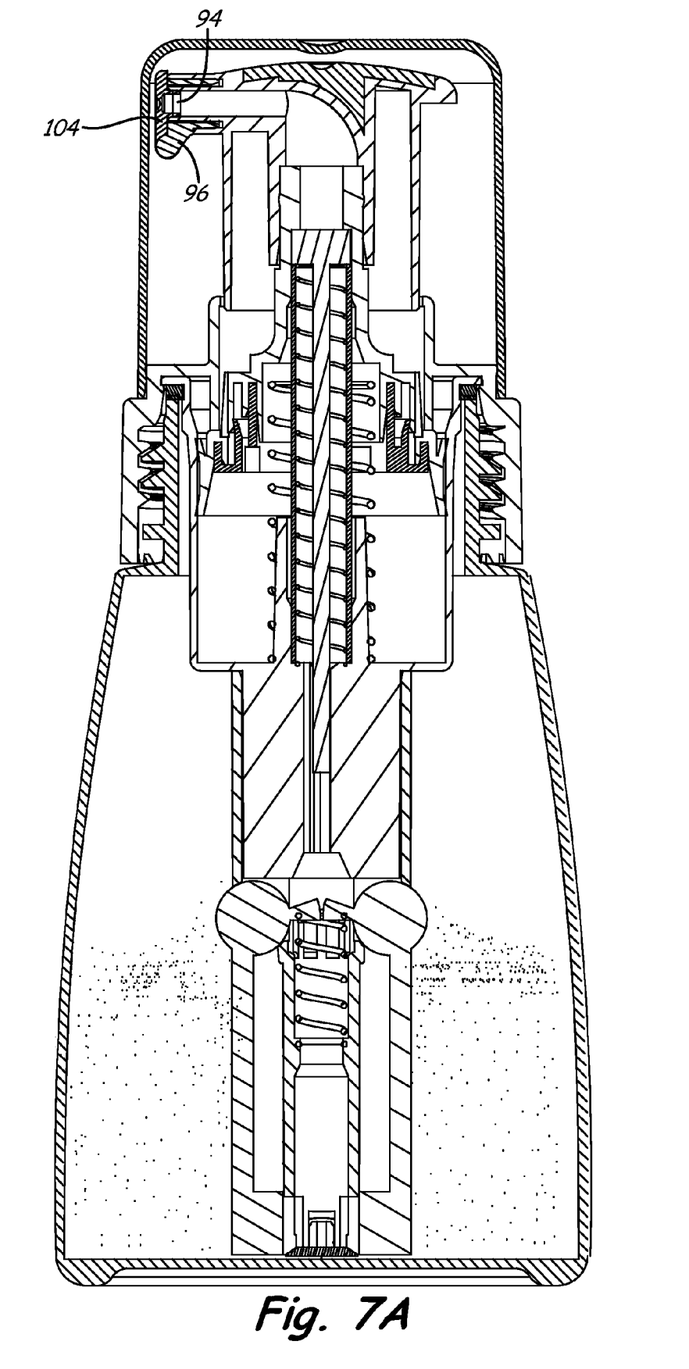
FIG. 7A is a cross-sectional view of a dispenser of the present invention in a top position.
Figure 7B:
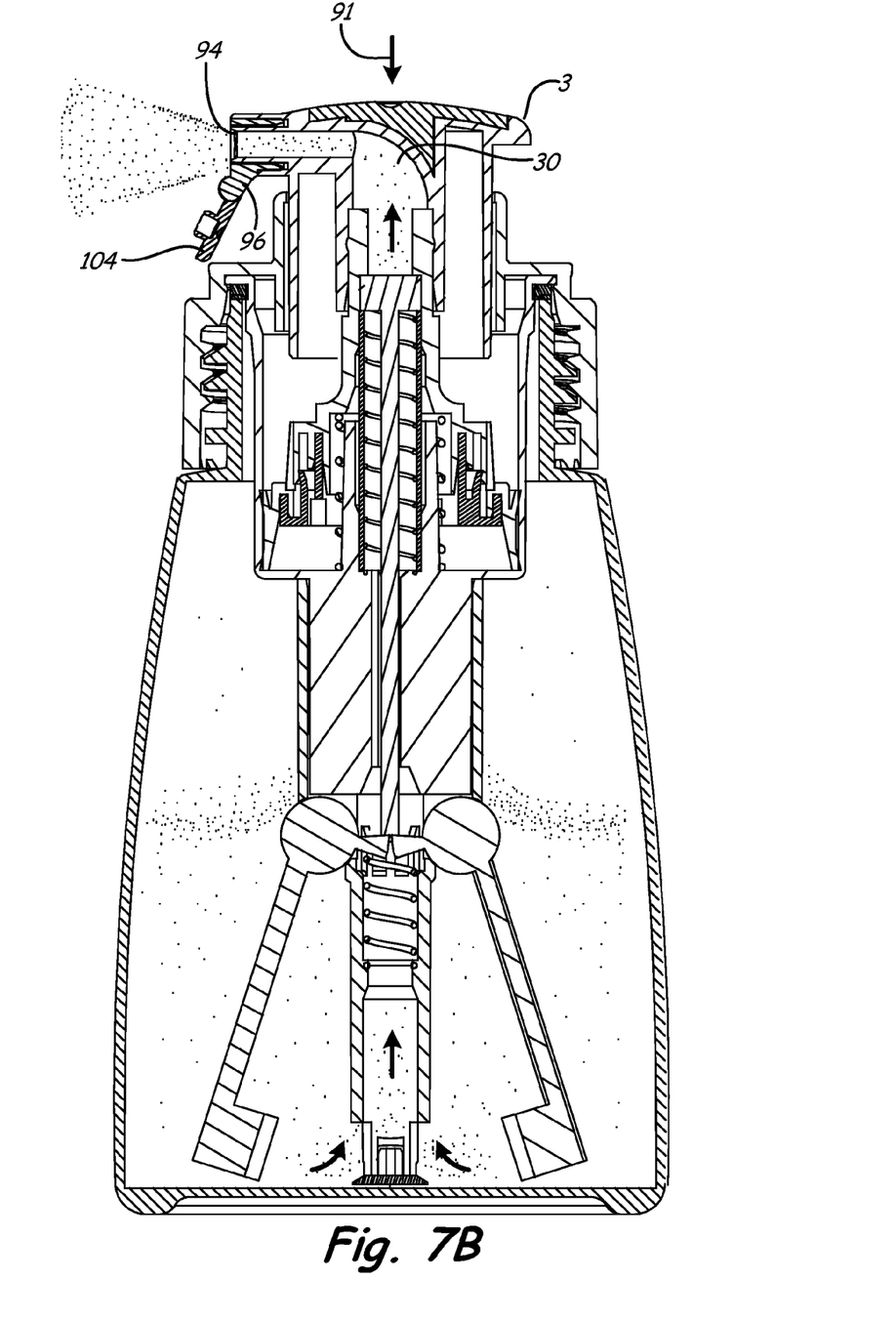
FIG. 7B is a cross-sectional view of the dispenser illustrated in FIG. 7A in a bottom position.

Another embodiment of the invention is illustrated in FIGS. 7A and 7B, wherein a nozzle cap 104 may be pivotally secured to cap bracket 96 to selectively open and close outlet 94 of dispensation chamber 30 at cap 3.

In addition to the forgoing, the operation of pump dispenser 1 will be described with reference to the drawings. Initially, nozzle member 15 is rotated along direction 97 from a closed condition to an open condition to permit downward movement of cap 3, and to present channel 90 into communication with dispensation chamber 30 at cap 3. When a downward force along directional arrow 91 is placed upon cap 3, such force is transmitted by cap shoulder 72 to piston head platform 70 to thereby transfer the downward axial motion along directional arrow 37 to piston 4. Such downward motion is also transmitted from piston rod shoulder 76 to actuator rod head 78 so that actuator rod 17 also proceeds axially downward along directional arrow 37.

As piston 4 proceeds axially downwardly in the pump downstroke, air pressure in pump chamber 26 increases to a point at which separation valve 20 opens to permit the passage of air into pickup chamber 28. As piston 4 and actuator rod 17 continue downward movement, actuator rod end portion 80 comes into contact with, and pushes manipulator tab 65 downwardly to cause manipulators 19 to pivot about manipulator pivot 60. As manipulators 19 operate, an amount of solidous material 21 enters into pickup chamber 28 through intake opening 32, wherein the pressurized air stream motivates the solidous material into a mixed air/solidous material flow stream into dispensation chamber 30. Continued air pressure forces the flow stream mixture out through outlet 94 and channel 90 of nozzle member 15, as illustrated in FIG. 6B. Removal of the force upon cap 3 permits first and second bias members 8, 13, and scaffold 9, to restoratively urge piston 4, actuator rod 17, and manipulator tabs 65 upwardly to place manipulator arm distal end 66 in a covering relationship with intake opening 32, and to urge piston 4 and actuator rod 17 toward to position 46. The negative air pressure created in pump chamber 26 as a result of the expanding volume in pump chamber 26 forces open air intake valve 7 to permit external environment air to enter into pump chamber 26 to substantially equalize internal and external pressures. As piston 4 and actuator rod 17 reach top position 46, pump dispenser 1 is ready for a subsequent pumping action.

The invention has been described herein in considerable detail in order to comply with the patent statutes, and to provide those skilled in the art with the information needed to apply the novel principles and to construct and use embodiments of the invention as required. However, it is to be understood that various modifications may be accomplished without departing from the scope of the invention itself.

What is claimed is:

1. A pump dispenser, comprising:

a container defining a cavity for storing a dispensable material;

a pump body positionable in said cavity and having a pump chamber fluidly communicatable with a pickup chamber that is fluidly communicatable with a dispensation chamber, wherein at least a portion of said dispensation chamber is defined by a lumen of a flexible member to sealingly separate said dispensation chamber from said pump chamber, so that said pump chamber is fluidly communicatable with said dispensation chamber only through said pickup chamber, said pump body further including an intake opening communicating said cavity with said pickup chamber, and a central axis defining mutually perpendicular axial and radial directions; and a piston positioned at said pump chamber and slidably engaged with said pump body, said piston being axially movable in said pump chamber in a first axial direction to force airflow into said pickup chamber to an extent sufficient to carry the dispensable material through said dispensation chamber.

2. A pump dispenser as in claim 1, including a scaffold radially supporting said flexible member to maintain open said lumen.

3. A pump dispenser as in claim 2 wherein said scaffold is disposed in said lumen in contact with said flexible member.

* * * * *